United States Patent [19]

Loechel et al.

[11] Patent Number: 5,054,835
[45] Date of Patent: Oct. 8, 1991

[54] FOOD HANDLING IMPLEMENT

[75] Inventors: Stephen J. Loechel, Woodville; Kerry W. Henderson, South Australia, both of Australia

[73] Assignee: Tango Proprietary Limited, Woodville, Australia

[21] Appl. No.: 584,200

[22] Filed: Sep. 18, 1990

[30] Foreign Application Priority Data

Sep. 21, 1989 [AU] Australia .................... PJ6474

[51] Int. Cl.⁵ ............................................. A47G 21/02
[52] U.S. Cl. ...................................... 294/99.2; 30/150; 294/3
[58] Field of Search ............................ 294/2, 3, 7-8.5, 294/11, 16, 25, 28, 33, 99.1, 99.2, 104, 106; 30/122, 123, 142, 147, 149, 150, 323, 324; D7/643-645, 683, 686

[56] References Cited

U.S. PATENT DOCUMENTS

| 1,260,302 | 3/1918 | Barrows | 294/99.2 |
| 1,765,974 | 6/1930 | Foltis | 30/150 |
| 2,670,234 | 2/1954 | Roop | 294/99.2 |
| 2,674,793 | 4/1954 | Dominick | 294/3 X |
| 2,994,553 | 8/1961 | Banton | 294/106 |
| 3,356,405 | 12/1967 | Gruber | 294/3 |
| 4,199,180 | 4/1980 | Kelly | 294/99.2 X |
| 4,955,971 | 9/1990 | Goulter | 294/3 X |

FOREIGN PATENT DOCUMENTS

| 1116359 | 11/1961 | Fed. Rep. of Germany | 294/99.2 |
| 2551501 | 10/1977 | Fed. Rep. of Germany | 294/99.2 |
| 811925 | 4/1937 | France | 294/99.2 |
| 1093186 | 5/1955 | France | 294/7 |
| 1213339 | 3/1960 | France | 294/99.2 |
| 454171 | 9/1936 | United Kingdom | 294/99.2 |

Primary Examiner—Johnny D. Cherry
Attorney, Agent, or Firm—Darby & Darby

[57] ABSTRACT

This invention relates to an improved food handling implement which in one mode of use forms a pair of separate elements which can be used individually as salad servers, while in another mode of use forms a set of tongs which can be operated by a person single handed. Each element has an elongate handle having an end portion which is angled with respect to the axis of the handle, and a connector cap for releasably connecting the elements together to enable the elements to be coupled together in approximately parallel relationship in the one mode of use, or with the angled end portions retained in facing relationship with the handles diverging away from the connector cap in the another mode of use, wherein the hand portions of the elements can be urged together or apart by virtue of the resilience of the handles.

9 Claims, 3 Drawing Sheets

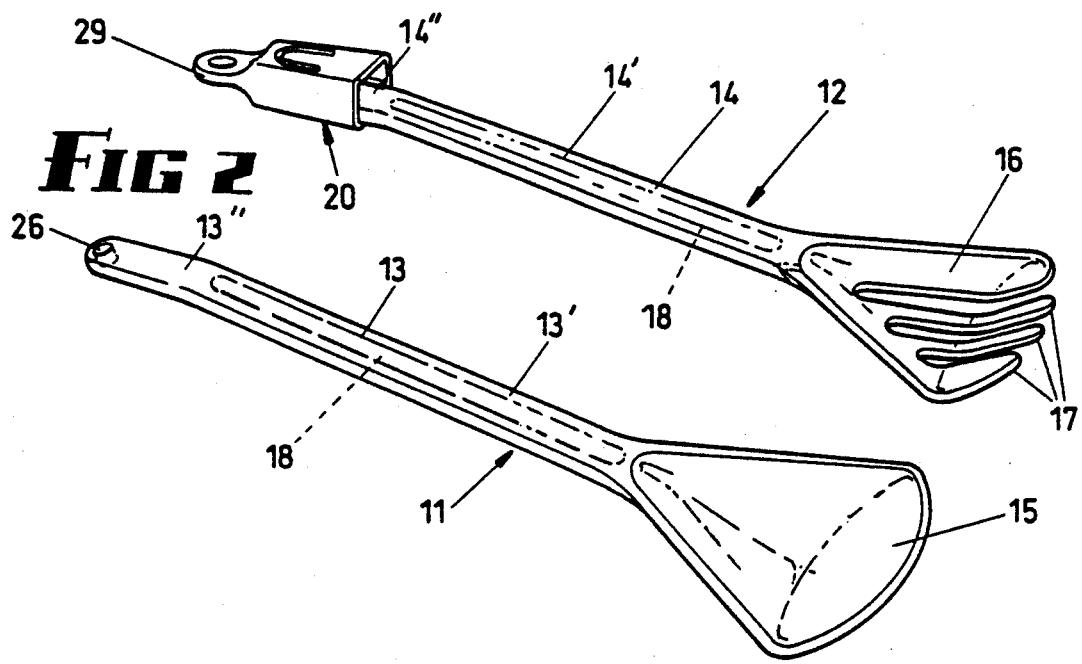
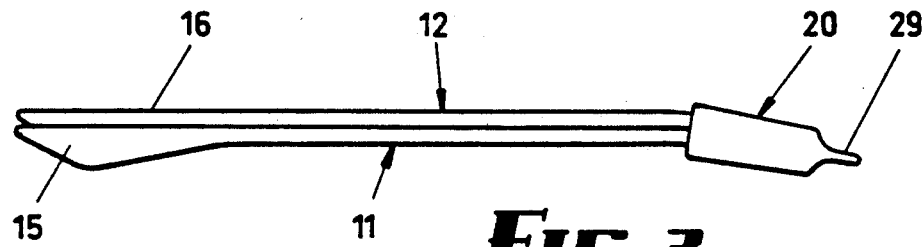
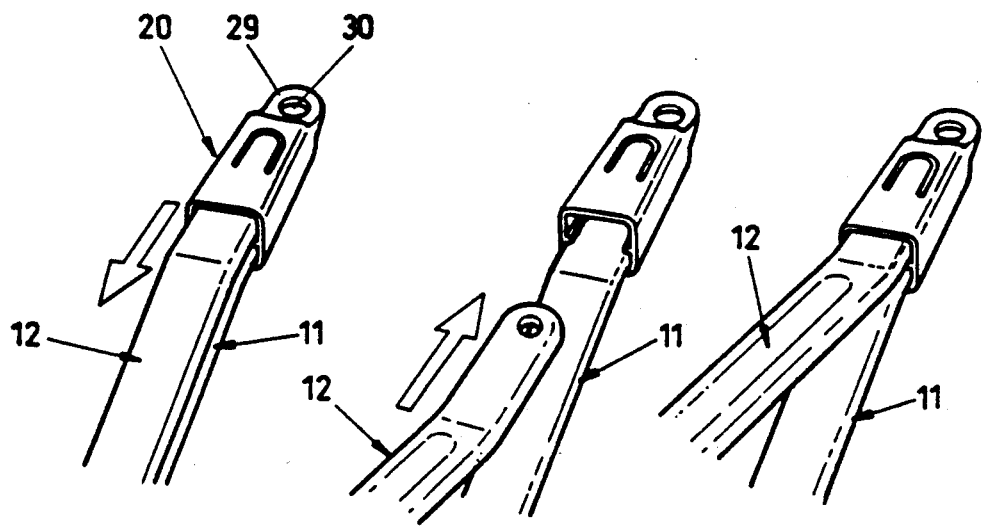

FOOD HANDLING IMPLEMENT

This invention relates to an improved food handling implement, and more particularly to a serving implement which in one mode of use forms a pair of separate elements which can be used individually, eg as a mixing-/serving spoon, strainer or as salad servers, whilst in another mode of use, the elements are coupled to one another to form a set of tongs which can be operated by a person single-handed.

Many different forms of food serving devices such as salad servers and one-handed tongs are known to the inventors herein. Most sets of salad servers comprise two separate elements (one a serving spoon, the other a serving fork) formed of moulded plastics material. With such serving sets where there is no connection between the elements, the elements become separated and one of the elements often is lost. There is a need therefore for sets of salad servers to be designed in a way where they can be retained and stored together.

One well known form of food serving tongs comprises a pair of spring-loaded pivotally connected tong arms formed of sheet metal but these are generally awkward to operate, aesthetically unpleasing and over a period of time are subject to unsightly rust marks.

It is the main object of the present invention to provide an improved food serving implement which in one mode of use forms a pair of individual salad servers, whilst in another mode of use forms a one-handed set of tongs. The food serving implement of this invention therefore is multi-functional.

It is a further object of the present invention to provide an improved food serving implement comprising two elements, e.g. a serving spoon and a serving fork, which can be conveniently retained together and stored away with the elements neatly nested together.

It is yet a further object of the present invention to provide an improved food serving implement which is easy to manipulate, ergonomically designed, and aesthetically pleasing.

According to one form of this invention therefore, an improved food serving implement comprises a pair of separable elements each having an elongate resilient handle connected to a head portion, the elongate handle of each said element being formed with an end portion which is angled with respect to the longitudinal axis of the handle, and connector means for releasably connecting together said elements to enable the elements to be coupled together, one on top of the other in contiguous relationship for storage purposes, or in a position where the angled end portions are retained in facing relationship with the handles diverging away from the angled end portions, in which position the implement can be used as a pair of tongs relying upon the resilience of the handles to urge the head portions of the elements together or apart.

In a preferred arrangement, the releasable connecting means comprises a removable end retention cap comprising a socket portion for snugly receiving the angled end portions of the handles.

Preferably, said retention cap is provided with at least one flexible, resilient finger or tab formed in a wall thereof, said finger having a projection on its inner surface which, when an element is inserted into the cap, co-operates with an opening or recess formed adjacent the free end of the element, to effect a snap-fitting engagement between the angled end of the element and the cap.

Preferably, the cap is compartmentalised into two socket portions, one for each element, and the upper and lower walls of the cap converge toward the distal end of the cap.

Preferably, the head portion of one of the elements is spoon shaped, whilst the head portion of the other element has a fork-like configuration.

Preferably, the elements of the serving implement are formed of polycarbonate material.

In order to more fully explain the present invention, an embodiment is described hereunder in some further detail with reference to and as illustrated in the accompanying drawings, in which:

FIG. 2 is a perspective view of the implement with the elements separated;

FIG. 3 is a side elevation of the implement in its stored condition;

FIG. 4 illustrates the steps required to convert the implement from its stored condition to its use as a pair of tongs;

Figure 1:
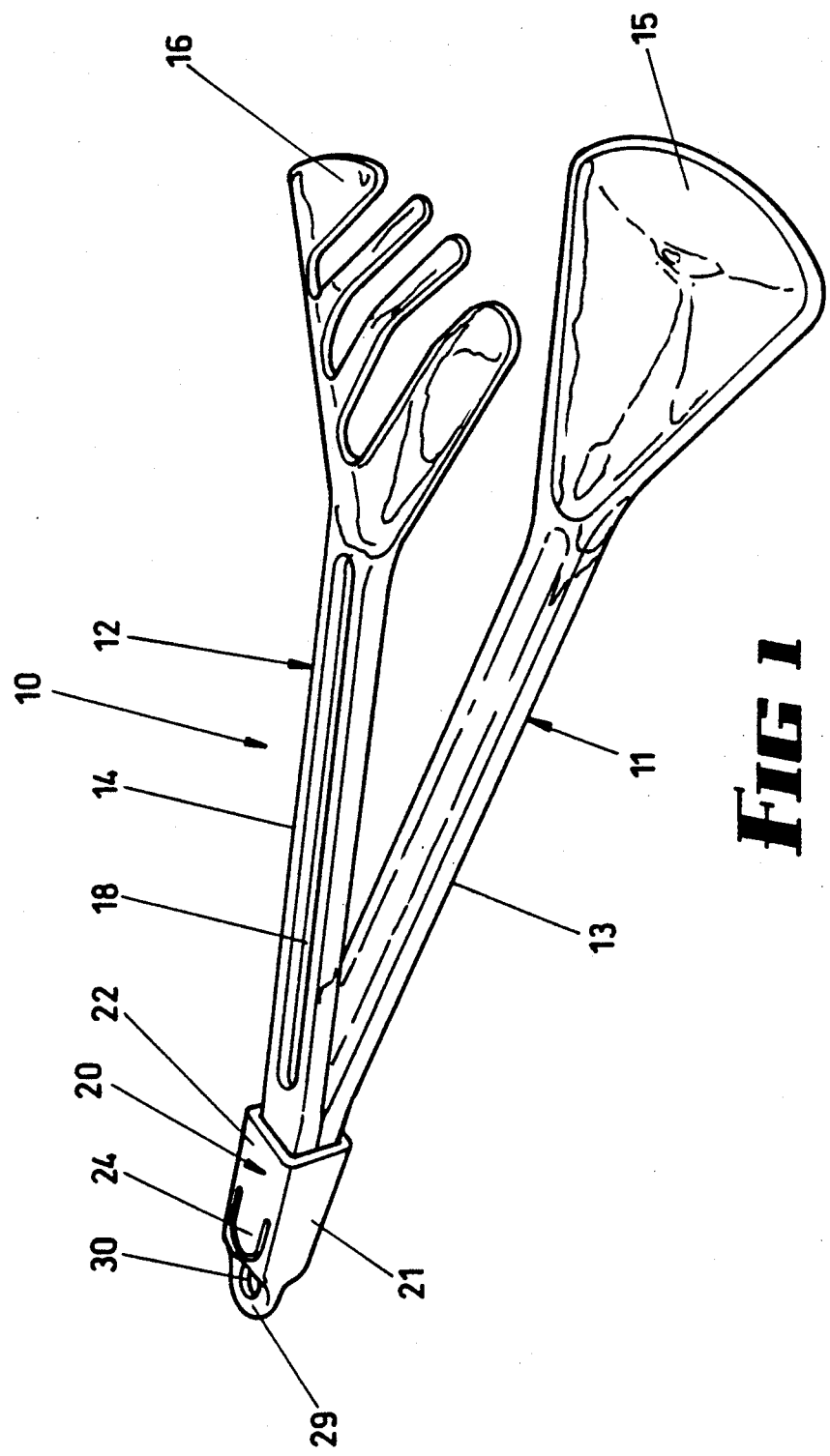
FIG. 1 is a perspective view of the implement when used as tongs.

In this embodiment, a food serving implement 10 comprises a serving spoon member 11 and a serving fork member 12, each member 11, 12 comprising an elongate handle 13, 14 which are identical in size and shape. Each of the handles 13, 14 has a linear portion 13', 14' which merges with an angled end portion 13", 14" at its proximate end and at its distal end in a head portion 15, 16, the portion 15 being shaped in the form of a spoon, and the portion 16 being shaped and configured in the form of a fork.

The members 11, 12 are designed and constructed so that they can be placed one on top of the other in a relatively flat condition with the head portion of one nested within the head portion of the other, and the handles 13, 14 in contiguous relationship. Preferably, each of the members 10, 11 is moulded of resilient polycarbonate material which is both almost unbreakable, shatterproof and heat resistant to 138° C.

In this embodiment each of the head portions 15, 16 has an approximately triangular shape with its inner face being dished. The fork-like head 16 is formed with a plurality of slot formations 17 extending inwardly from the lower edge of the head 16 and being parallel to one another and inclined at an angle relative to the longitudinal axis of the handle 14.

Each handle 13,14 is also provided with a longitudinally extending recessed portion 18 on its rear face, this being designed to reduce the cross-sectional area of the handle (and thereby save on material) as well as minimise the likelihood of the handle being formed with bubble formations during moulding.

The members 10, 11 are releasably retained together by means of an end retention cap 20 which is formed with socket forming walls 21, 22 which define a socket 23 sized and dimensioned so as to snugly receive the angled end portions 13", 14" of the handles 13, 14. With the cap 20 in its engaged position, the end portions 13", 14" are firmly held within the socket 23 with the facing surfaces of the end portions 13", 14" in contiguous relationship.

To releasably lock the handles to the cap 20, the opposed upper and lower walls 22 of the cap 20 are formed with opposed deflectable resilient tabs or tongues 24 which have a detent 25 on their inner face, each detent 25 being arranged to snap-fittingly engage in an opening 26 formed adjacent the end of the handles 13, 14 of the members 11, 12. The angled end portions 13″, 14″ can be separately inserted into the socket 23 and releasably secured therein. When the implement is used as separate salad servers, the cap 20 may be retained on the end of one of the handles 13, 14.

Figure 6:
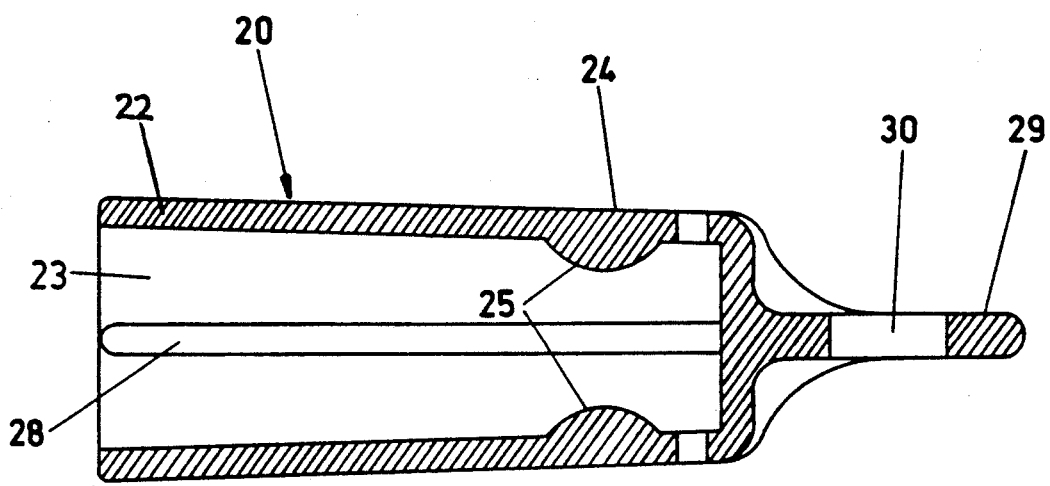
FIG. 6 is a longitudinal sectional view of the cap of FIG. 5.

As shown in FIG. 6, the inner surfaces of the opposed side walls 21 of the cap 20 are provided with horizontally aligned longitudinally extending ribs 28 so as to divide the interior of the cap 20 into two halves, each of which is designed to accommodate a respective angled end portion 13″, 14″ and to faciliate their entry into the cap. The closed end of the cap 20 is provided with a flattened lug portion 29 having a central opening 30 to enable the implement 10 to be conveniently hung on a hook for storage purposes.

Figure 5:
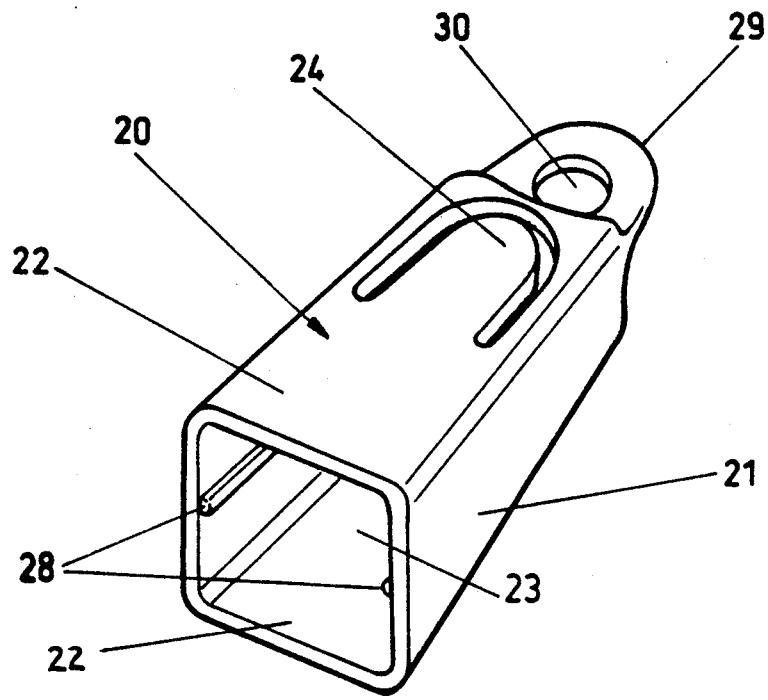
FIG. 5 is a perspective view of the end cap alone.

As also shown in FIGS. 5 and 6, the walls 22 converge slightly towards the closed end of the cap 20, to assist the snap fitting engagement of the ends 13″, 14″ within the cap 20.

When the food serving implement is in its stored condition, the elements 11, 12 lie flat one on top of the other with their angled end portions 13″, 14″ releasably engaged in the socket portion 23 of the end cap 20. By removing one of the members 11, 12 from the end cap 20, the members can be used individually as salad servers. However, by removing one of the members 11, 12 from the retention cap 20, and rotating that member through 180° and re-inserting it into the retention cap so that the handles 13, 14 diverge away from the end cap 20, the implement can be used single-handed by a person as a set of tongs. The resilient nature of the handles 13, 14 allows the head portions of the members 11, 12 to be urged together by applying pressure to the handles 13, 14, and separated upon release of that pressure.

In a non-illustrated variation to the above-described embodiment, the removable end retention cap 20 may be replaced by means of a clip formation integrally moulded on one of the angled end portions 13″, 14″ of the handles 13, 14. Thus, the connector means between the handles 13, 14 need not be a removable separate cap member.

A brief consideration of the above-described embodiment will indicate that the invention provides a versatile multi-purpose food serving implement which is of extremely simple design, is aesthetically pleasing, and permits the implement to be quickly and simply converted from a mode of use as individual salad servers to a mode of use as a set of one-handed operated tongs.

What we claim is:

1. A food serving implement comprising a pair of separable elements, each having an elongate resilient handle connected to a head portion, the elongated handle of each of said elements being formed with an end portion which is angled with respect to the longitudinal axis of the handle, and connector means for releasably connecting together said elements to enable said elements to be coupled together, one on top of the other, wherein said handles are in one of a first position in which said handles are approximately parallel for storage purposes, and a second position in which the angled end portions are retained in facing relationship with the handles diverging away from said connector means and in which the implement can be used as a pair of tongs wherein the head portions of the elements can be urged relative to each other by virtue of the resilience of the handles, said connector means comprising a removable end retention cap having walls defining a socket portion for snuggly receiving said angled end portions of said handles, said angled end portions when thus received, having respective facing surfaces thereof contiguous with one another, said end retention cap being provided with at least one flexible resilient finger formed in a wall thereof, said finger having an inner surface and a projection formed thereon which projects into the socket portion of said cap and is arranged so that when said elements are inserted into the cap, said projection lockingly engages in an opening formed adjacent a free end of a respective element to effect a snap fitting engagement of the angled end portion of the element within said cap, said socket portion of the cap being horizontally divided into two halves by longitudinally extending ribs formed on opposed side walls of said cap, each socket portion half slidably accommodating a respective angled end portion.

2. A food serving implement according to claim 1 wherein said retention cap has a closed end, and said walls include upper and lower walls converging toward said closed end.

3. A food serving implement comprising a pair of separable elements, each having an elongate resilient handle connected to a head portion, the elongated handle of each of said elements being formed with an end portion which is angled with respect to the longitudinal axis of the handle, and connector means for releasably connecting together said elements to enable said elements to be coupled together, one on top of the other, wherein the handles are in one of a first position in which the handles are approximately parallel for storage purposes, and a second position in which the angled end portions are retained in facing relationship with the handles diverging away from said connector means and in which the implement can be used as a pair of tongs wherein the head portions of the elements can be urged relative to each other by virtue of the resilience of the handles, said connector means comprising a removable end retention cap having walls defining a socket portion for snugly and independently reversibly receiving each of said angled end portions of the handles, said angled end portions when thus received, having respective facing surfaces thereof substantially contiguous with one another.

4. A food serving implement according to claim 3, wherein said end retention cap is provided with a flattened lug portion projecting from its closed end, said lug portion having a central opening formed therein, whereby the implement can be hung on a hook for storage purposes.

5. A food serving implement according to claim 3, wherein each said element is moulded of polycarbonate material.

6. A food serving implement according to claim 3 wherein said end retention cap is provided with at least one flexible resilient finger formed in one of said walls, said finger having an inner surface and a projection formed thereon which projects into the socket portion of said cap and is arranged so that when said elements are inserted into the socket portion, said projection lockingly engages in an opening formed adjacent a free end of a respective element to effect a snap-fitting engagement of the angled end portion of the element within said cap.

7. A food serving implement according to claim 6 wherein said end retention cap is provided with another flexible resilient finger formed in another of said walls which lies opposite said one wall.

8. A food serving implement according to claim 3 wherein one of said head portions is spoon-shaped and the other of said head portions has a fork-like configuration, said head portions being in nesting engagement in the first position of said handles.

9. A food serving implement according to claim 8, wherein said fork-like configuration comprises resiliently deflectable, spaced-apart parallel fingers, each of which extends at an angle with respect to the longitudinal axis of the handle.

* * * * *